May 27, 1969  G. C. A. SUNDERLAND  3,447,158
LOW PROFILE AIRCRAFT ANTENNA WITH DIELECTRIC REFLECTOR TO
REDUCE DESTRUCTIVE INTERFERENCE
Filed Sept. 15, 1966

INVENTOR
GRETA COLLEEN ADIE SUNDERLAND
By
Cushman, Darby & Cushman
Attorneys 3,447,158
LOW PROFILE AIRCRAFT ANTENNA WITH DI-
ELECTRIC REFLECTOR TO REDUCE DESTRUC-
TIVE INTERFERENCE
Greta Colleen Adie Sunderland, Woking, Surrey, England,
assignor to National Research Development Corpora-
tion, London, England
Filed Sept. 15, 1966, Ser. No. 579,635
Claims priority, application Great Britain, Sept. 17, 1965,
39,747/65
Int. Cl. H01q 1/28
U.S. Cl. 343—708                                     15 Claims The present invention relates to aerial systems and is particularly useful for the transmission and reception of circularly polarised electromagnetic waves from and to an aerial mounted on the fuselage of an aircraft and in similar situations.

When an aerial is mounted close to a metallic sheet, such as that with which an aircraft fuselage is covered, reflections from the metallic sheet break the free-space radiation pattern of the aerial into lobes with maxima and minima caused by interference of the reflected and the directly transmitted waves from the aerial. Furthermore, waves which are polarised normal to the plane of incidence are reflected from the metallic sheet with a 180 degree phase change, whilst waves which are polarised in the plane of incidence suffer no phase change. It follows that where there are minima in the resultant polar diagram for waves of one polarisation there will approximately be maxima in the resultant polar diagram for waves of the other polarisation and vice versa. This is particularly undesirable when the aerial is to transmit or receive circularly polarised waves.

It is an object of the present invention to provide an aerial system for the transmission or reception of circularly polarised waves in which the above-mentioned disadvantages are at least partially overcome.

According to the present invention, there is provided an aerial system including a primary radiator for transmitting or receiving circularly polarised electromagnetic waves and a secondary radiator including a layer of dielectric material situated adjacent the primary radiator so as to reflect at angles of incidence greater than the Brewster angle a significant amount of energy radiated from or received by the primary radiator and impinging on the dielectric layer, the dielectric layer having a layer of radio absorbing material on the opposite side thereof from the primary radiator. The layer of radio absorbing material may have a metallic sheet, such as the skin of an aircraft fuselage on its side remote from the dielectric layer.

In order that the invention may be more clearly understood, embodiments thereof will now be described, by way of example, with reference to the accompanying drawings, of which:

Figure 1:
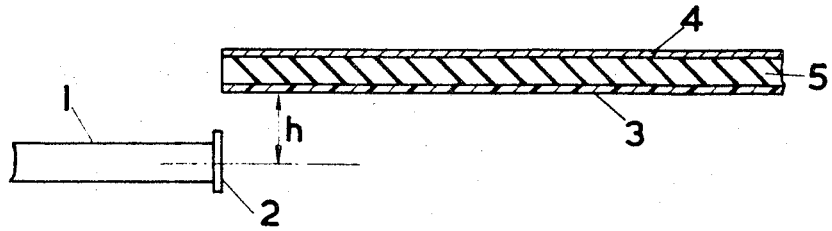
FIGURE 1 is a sectional diagram of one form of aerial.

FIGURE 1 shows a primary radiator comprising an open-ended waveguide 1 having a choke flange, represented by the line 2, at its aperture. This choke flange prevents currents spreading along the outside of the waveguide 1 so that a smooth radiation pattern can be obtained therefrom. The waveguide 1 is fed with and radiates circularly polarised waves. Offset from the waveguide 1 by a distance $h$ is a secondary radiator consisting of a dielectric layer 3 of low-loss dielectric material, a metallic layer 4 and a layer 5 of radio absorbing material sandwiched between the layers 3 and 4. The secondary radiator lies parallel to the direction of maximum sensitivity of the primary radiator, which in this case is the longitudinal axis of the waveguide 1. The radio absorbing material may be, for example, rubber loaded with graphite and has ideally a characteristic impedance equal to that of free space. The metallic layer 4 may be part of the metallic skin of an aircraft fuselage.

The theory underlying the operation of the aerial shown in FIGURE 1 is as follows. Transmissions from the aperture of the waveguide 1 will reach a distant point lying, say, along or near to the axis of the waveguide 1 both directly and by reflection from the secondary radiator including the dielectric layer 3. If the reflected transmission impinges on the dielectric layer at an angle of incidence greater than the Brewster angle, there will be a phase change on reflection of 180 degrees both in waves which are polarised parallel to the dielectric layer (that is to say, polarised normal to the plane of incidence) and in waves which are polarised in the plane of incidence. The Brewster angle of incidence, $\theta_1$, is given by $$\theta_1 = \tan^{-1}\sqrt{\epsilon_1/\epsilon_0}$$

where $\epsilon_1$ is the dielectric constant of the dielectric layer 3 and $\epsilon_0$ is the dielectric constant of free space. It follows that since both waves suffer a phase change of 180 degrees, the polar radiation pattern for both waves will be similar for those transmission paths involving reflection at an angle of incidence greater than the Brewster angle.

It may be shown that the coefficient of reflection increases as the dielectric constant of the dielectric layer 3 increases. However, the Brewster angle also increases as the dielectric constant increases so that the angle of elevation above the plane of the dielectric layer 3 over which the radiation patterns for both waves are similar is reduced. It may also be shown that maximum reflection from the dielectric layer 3 occurs when the electrical thickness, $d$, of the dielectric layer is $$d_1 = \frac{(2n+1)\lambda_0}{4\sqrt{\dfrac{\epsilon_1}{\epsilon_0} - \sin^2\theta}}$$

when $n$ is a positive integer, $\lambda_0$ is the free space wavelength of the transmission and $\theta$ is the angle of incidence. Thus, maximum reflection occurs when the electrical thickness of the dielectric layer 3 is an odd number of quarter wavelengths.

The distance, $h$, of the primary radiator 1 from the dielectric layer 3 of the secondary radiator is chosen so that the reflected and direct waves travelling from the primary radiator will reinforce at a desired angle of elevation. The secondary radiator including the dielectric layer 3 need not lie parallel to the direction of maximum sensitivity of the waveguide 1 as shown but may diverge away from this direction, the divergence being chosen so that the desired radiation pattern may be achieved using a secondary radiator of convenient physical dimensions. A suitable divergence may allow a smaller secondary radiator to be used.

Figure 2:
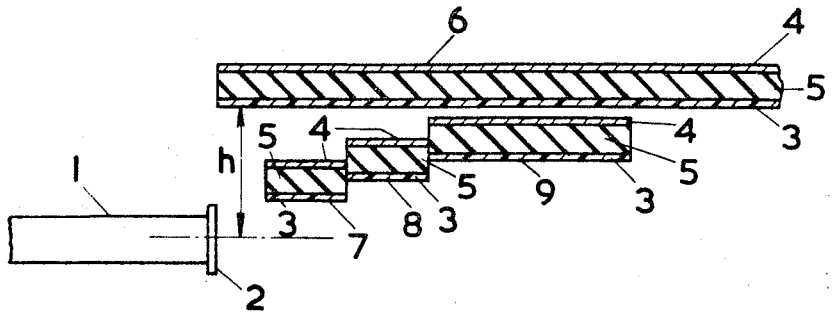
FIGURE 2 is a sectional diagram of a modified form of the aerial shown in FIGURE 1.

In order to increase the beamwidth in elevation from the plane of the dielectric layer 3, a secondary radiator having a number of steps may be employed, the steps causing the natural minima of the radiation pattern to be filled in. An example of such an arrangement is shown in FIGURE 2. FIGURE 2 shows a primary radiator consisting of a waveguide 1 and a choke flange 2 at its aperture. The secondary radiator comprises a main reflector 6 and three subsidiary reflectors 7, 8 and 9 arranged in steps. Each of the reflectors consists of a dielectric layer 3, a layer 5 of radio absorbing material and a metallic layer 4. The metallic layer 4 of the main reflector 6 may be formed from part of the metallic skin of an aircraft.

The choke flange 2 shown in FIGURES 1 and 2 is not essential and may be omitted. In fact, the primary radiator may be any radiator of circularly polarised waves. For example, the waveguide 1 may be replaced by a pair of crossed dipoles suitably energised to produce circular polarisation. Alternatively, a helical aerial may be employed to produce circularly polarised waves.

Figure 3:
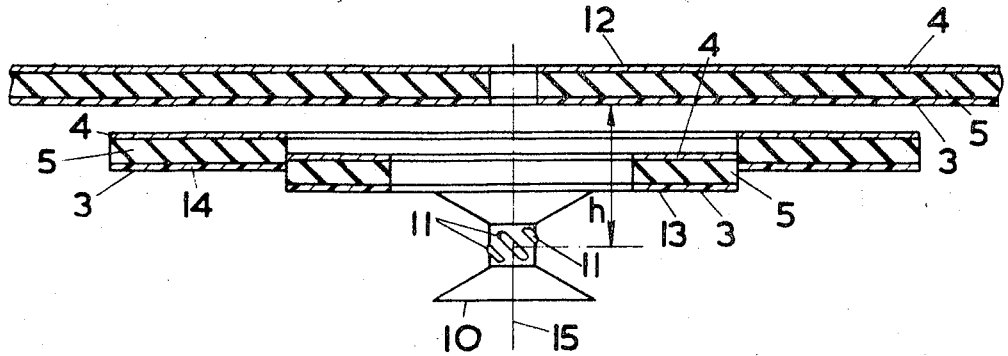
FIGURE 3 is a part-sectional diagram of another form of aerial.

FIGURE 3 shows a primary radiator comprising a biconical horn 10 which may be energised across slots 11 to produce circularly polarised waves in an omnidirectional polar pattern. In this case, there is provided a secondary radiator comprising a main reflector 12 and two subsidiary reflectors 13 and 14 arranged in steps. The main reflector 12 and the subsidiary reflectors 13 and 14 are each an annulus (as shown in FIGURE 3) so that they are symmetrical about the transverse axis of symmetry 15 of the horn 10. Each of the reflectors 12, 13 and 14 is made up of a dielectric layer 3, a layer 5 of radio absorbing material and a metallic layer 4. The main reflector 12 may as an alternative be continuous and the metallic layer 4 of the main reflector may be formed from part of the metallic skin of an aircraft. The plane of maximum sensitivity of this aerial system lies at right angles to the transverse axis of symmetry 15.

It will, of course, be realised that in view of the reciprocity theorem, although the aerial systems hereinbefore described have been referred to as radiators or as radiating, they will function equally well in receiving circularly polarised electromagnetic waves. The metallic layer 4 of the above-described embodiments may be dispensed with. However, these aerials are primarily intended for mounting on an aircraft fuselage, in which case the metallic layer 4 will be part of the metallic skin of the aircraft and/or other metallic mounting supports. Although the secondary radiators shown in the drawings are plane, their surfaces may be slightly curved, for example, to suit the contours of an aircraft fuselage. Indeed, the stepped reflectors of FIGURES 2 and 3 may be replaced by a single reflector having a continuous curve.

I claim:

1. An aerial system comprising a primary radiator for transmitting or receiving circularly polarized electromagnetic waves and a secondary radiator comprising a layer of dielectric material situated adjacent the primary radiator so as to reflect at angles of incidence greater than the Brewster angle a significant amount of energy radiated from or received by the said primary radiator and impinging on the said layer of dielectric material and a layer of radio absorbing material adjacent the said layer of dielectric material on the opposite side thereof from the said primary radiator.

2. An aerial system as claimed in claim 1 wherein the said secondary radiator lies parallel to the direction of maximum sensitivity of the said primary radiator.

3. An aerial system as claimed in claim 1 wherein the said secondary radiator diverges away from the direction of maximum sensitivity of the said primary radiator.

4. An aerial system as claimed in claim 3 wherein the said secondary radiator comprises a main reflector and a number of subsidiary reflectors arranged in steps, each reflector including a layer of dielectric material having a layer of radio absorbing material on the opposite side thereof from the said primary radiator.

5. An aerial system as claimed in claim 1 wherein there is provided a metallic sheet on the side of the said layer of radio absorbing material remote from the said layer of dielectric material.

6. An aerial system as claimed in claim 5 wherein the said metallic sheet forms part of the metal skin of an aircraft.

7. An aerial system as claimed in claim 1 wherein the electrical thickness of the said layer of dielectric material is an odd number of quarter wavelengths in free space of the signal transmitted or received by the aerial system.

8. An aerial system as claimed in claim 1 wherein the primary radiator is an open-ended waveguide.

9. An aerial system as claimed in claim 8 wherein the waveguide has a choke flange at its aperture.

10. An aerial system as claimed in claim 1 wherein the primary radiator is a biconical horn aerial.

11. An aerial system as claimed in claim 1 wherein the said secondary radiator diverges away from the plane of maximum sensitivity of the said primary radiator.

12. An aerial system as claimed in claim 11 wherein the said secondary radiator comprises a main reflector and a number of subsidiary reflectors arranged in steps, each reflector including a layer of dielectric material having a layer of radio absorbing material on the opposite side thereof from the said primary radiator.

13. An aerial system as claimed in claim 12 wherein there is provided a metallic sheet on the side of the said layer of radio absorbing material remote from the said layer of dielectric material.

14. An aerial system as claimed in claim 13 wherein the metallic sheet of the main reflector forms part of the metallic skin of an aircraft.

15. An aerial system as claimed in claim 14 wherein the primary radiator is a biconical horn aerial.

References Cited

UNITED STATES PATENTS 2,822,542   2/1958   Butterfield _____ 343—785

ELI LIEBERMAN, *Primary Examiner.*

U.S. Cl. X.R.

343—755, 775, 909